(12) United States Patent
Zimmerle et al.

(10) Patent No.: US 12,455,281 B2
(45) Date of Patent: Oct. 28, 2025

(54) DEVICES AND METHODS FOR MINIMIZING HOOK EFFECT INTERFERENCE IN IMMUNOASSAYS

(71) Applicant: Siemens Healthcare Diagnostics Inc., Tarrytown, NY (US)

(72) Inventors: Chris Zimmerle, Goshen, IN (US); Gary Rheinheimer, Goshen, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 168 days.

(21) Appl. No.: 17/813,204

(22) Filed: Jul. 18, 2022

(65) Prior Publication Data

US 2022/0349877 A1  Nov. 3, 2022

Related U.S. Application Data

(62) Division of application No. 16/609,309, filed as application No. PCT/US2018/031085 on May 4, 2018, now abandoned.

(60) Provisional application No. 62/501,284, filed on May 4, 2017.

(51) Int. Cl.
  *G01N 33/53* (2006.01)
  *B01L 3/00* (2006.01)
  *G01N 21/80* (2006.01)
  *G01N 33/68* (2006.01)

(52) U.S. Cl.
  CPC .......... *G01N 33/5306* (2013.01); *B01L 3/502* (2013.01); *G01N 21/80* (2013.01); *G01N 33/6839* (2013.01); *B01L 2200/16* (2013.01); *B01L 2300/0861* (2013.01)

(58) Field of Classification Search
  CPC ............... G01N 33/5306; G01N 21/80; G01N 33/6839; G01N 33/52; G01N 33/54393; G01N 33/583; G01N 33/68; B01L 3/502; B01L 2200/16; B01L 2300/0861; B01L 3/5027
  USPC ..... 436/501, 702, 43, 47; 435/7.1, 600, 356, 435/287.7, 287.9, 288.7, 808, 28, 287.1, 435/288.4, 288.5; 422/401, 502, 503, 422/504, 554
  See application file for complete search history.

(56) References Cited

U.S. PATENT DOCUMENTS

| | | |
|---|---|---|
| 2,908,787 A | 10/1959 | Scully |
| 5,766,875 A | 6/1998 | Hafeman et al. |
| 5,908,787 A | 6/1999 | Cast et al. |

(Continued)

FOREIGN PATENT DOCUMENTS

| | | | |
|---|---|---|---|
| JP | 2007500363 A | 1/2007 | |
| WO | WO-9325905 A1 * | 12/1993 | ......... G01N 33/5306 |

(Continued)

OTHER PUBLICATIONS

Pugia, M.J., Lott, J.A., Profitt, J.A. and Cast, T.K. (1999), High-sensitivity dye binding assay for albumin in urine. J. Clin. Lab. Anal., 13: 180-187 (Year: 1999).*

(Continued)

*Primary Examiner* — Bao-Thuy L Nguyen
*Assistant Examiner* — Ellis Follett Lusi

(57) ABSTRACT

Methods of minimizing hook effect interference in an immunoassay are disclosed. Also disclosed are reagents, kits, and immunoassay devices that may be utilized in accordance with the method.

19 Claims, 3 Drawing Sheets

(56) References Cited

U.S. PATENT DOCUMENTS

| | | | |
|---|---|---|---|
| 11,369,955 B2 * | 6/2022 | Archibald | A61K 51/0491 |
| 2003/0215358 A1 | 11/2003 | Schulman et al. | |
| 2003/0235512 A1 | 12/2003 | Carpenter et al. | |
| 2004/0176578 A1 | 9/2004 | Nolan et al. | |
| 2004/0219620 A1 | 11/2004 | Mayer | |
| 2007/0243634 A1 * | 10/2007 | Pamula | C12Q 1/686 |
| | | | 436/518 |
| 2008/0145949 A1 | 6/2008 | Song et al. | |
| 2008/0260581 A1 | 10/2008 | Rosman et al. | |
| 2010/0311185 A1 | 12/2010 | Schelp et al. | |
| 2012/0196304 A1 * | 8/2012 | Dees | G01N 33/54373 |
| | | | 422/69 |
| 2014/0186216 A1 | 7/2014 | Campbell et al. | |
| 2014/0273035 A1 | 9/2014 | Dowell et al. | |
| 2015/0369827 A1 | 12/2015 | Zimmerle et al. | |
| 2016/0008813 A1 | 1/2016 | Ledden et al. | |
| 2016/0025736 A1 | 1/2016 | Ledden et al. | |
| 2016/0318019 A1 | 11/2016 | Ledden et al. | |

FOREIGN PATENT DOCUMENTS

| | | | | |
|---|---|---|---|---|
| WO | 2013078130 A1 | 5/2013 | | |
| WO | WO-2014151450 A1 * | 9/2014 | | B01L 3/502715 |
| WO | 2015022406 A1 | 2/2015 | | |

OTHER PUBLICATIONS

International Search Report and Written Opinion on International Application No. PCT/US2018/031085 mailed Jul. 27, 2018.

European Search Report and Search Opinion of European Application No. 18794814.6 mailed Mar. 24, 2020.

Atlas Reagent Cartridge PRO 12, Package Description, Siemens, 2013, URL: https://www.info.pmda.go.jp/downfiles/ivd/PDF/341508_16100AMZ03365000_B_01_02.pdf.

Miko Kanzaki, et al., Usefulness of Urinary Albumin Measurement by Urine Test Strip Method Using Fully Automatic Urine Chemistry Analyzer, Medical Examination, 2015, vol. 64, No. 1, pp. 117-123.

Guidelines for Validation of Drug Concentration Analysis Method (ligand binding method) in Biological Samples in Drug Development, 2016, pp. 1-14, URL: https://www.pmda.go.jp/files/000206206.pdf.

English Translation of Japanese Office Action of Japanese Application No. 2019-560207 dated Mar. 16, 2021.

Seedher et al., "Spectrophotometric Studies on the Interaction of Bovine Serum Albumin with Triphenylmethane Dyes" Indian J. Pharm. Scl.; Year: 1998, vol. 60, pp. 297-301.

Yong-Ju et al., "Spectral Study on Interaction of Thymol Blue with Protein in Acidic Solution"; Analytica Chimica Acta; Year: 1997, vol. 341, pp. 97-104.

* cited by examiner

| [Albumin] | Spec nm | Spec Abs |
|---|---|---|
| 0 mg/dL | 595 | 0.420 |
| 121 mg/dL | 595 | 0.172 |
| 238 mg/dL | 595 | 0.150 |
| 0 mg/dL | 455 | 0.172 |
| 121 mg/dL | 455 | 0.265 |
| 238 mg/dL | 455 | 0.283 |

| [Albumin] | Spec nm | Spec Abs |
|---|---|---|
| 0 mg/dL | 552 | 0.545 |
| 121 mg/dL | 552 | 0.351 |
| 238 mg/dL | 552 | 0.134 |

| Buffer pH | [Albumin] | Spec nm | Spec Abs |
|---|---|---|---|
| 8 | 0 mg/dL | 617 | 0.131 |
| | 454 mg/dL | 617 | 0.045 |
| 9 | 0 | 572 | 0.376 |
| | 343 mg/dL | 572 | 0.271 |
| | 833 mg/dL | 572 | 0.179 |

DEVICES AND METHODS FOR MINIMIZING HOOK EFFECT INTERFERENCE IN IMMUNOASSAYS

CROSS REFERENCE TO RELATED APPLICATIONS/INCORPORATION BY REFERENCE STATEMENT

The subject application is a divisional of U.S. Ser. No. 16/609,309, filed Oct. 29, 2019; which is a US national stage application filed under 35 USC § 371 of International Application No. PCT/US2018/031085, filed May 4, 2018; which claims benefit under 35 USC § 119(e) of U.S. provisional Application No. 62/501,284, filed May 4, 2017. The entire contents of the above-referenced patent applications are hereby expressly incorporated herein by reference.

BACKGROUND

Immunoassay technologies are widely used in the field of medical diagnostics, and in particular with point of care analyzers that rely on absorbance based measurements. In particular, these assays are useful in the detection of various protein analytes in biological samples. Despite their widely accepted use in this field, various types of interferences are still observed with these assays. For example, limits in the detection range of immunoassay analyzers contribute to the interference phenomenon known as the "hook effect." The hook effect is observed when high analyte concentrations in a test sample actually cause a decrease in the assay response signal for the analyte, thereby resulting in the reporting of false negative or false low concentration results.

The hook effect is based on the saturation curve of antibody with antigen (see, for example, FIG. 1) and occurs when the concentration of an analyte in a test sample exceeds the binding capacity of the antibodies used in the assay reagents, thereby resulting in incomplete formation of the immune complexes required for creation of a signal. For example, excessively large concentrations of analyte can simultaneously saturate both capture and detection antibodies used in an immunoassay, thereby resulting in the "hook" or falsely decreased concentration measurement shown in FIG. 1. In these instances, false negative or false low results are reported, which negatively impacts the accuracy of the analyzer and can have catastrophic implications for patient care.

Most analyzers attempt to compensate for the hook effect through the use of mechanisms such as calibration curves, algorithms, and the like. In immunoassays with very large analyte concentration ranges, careful assay design and adjustments to the amounts of antibody reagents used and sample tested are typically required; thus, multiple assays may need to be conducted on a single sample to ensure validity of the results. Other methods currently used to eliminate the hook effect include the addition of a wash step in between the incubation of the sample with the capture antibody and the subsequent addition of the detection antibody; however, the addition of a wash step increases both the amount of time and machinery required to perform the assay. Rather, a one-step assay (where both antibodies are added at the same time) is desired for high-throughput analysis of biological samples.

DETAILED DESCRIPTION

Figure 1:
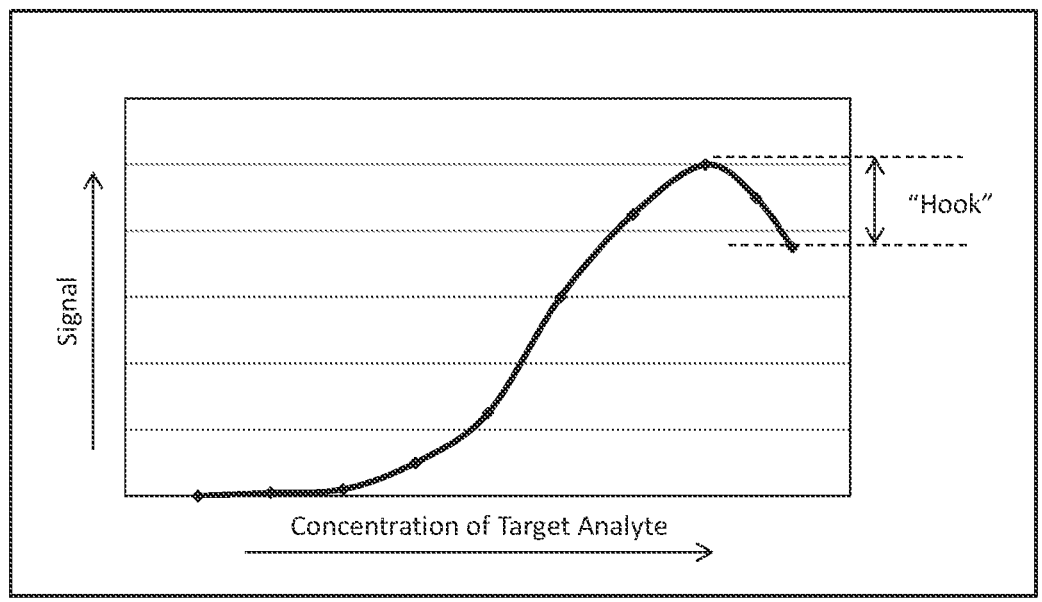
FIG. 1 demonstrates a high-dose hook effect type of interference observed in immunoassays when a high concentration of analyte is present.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All patents, published patent applications, and non-patent publications mentioned in the specification are indicative of the level of skill of those skilled in the art to which this presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles, compositions, and/or methods disclosed and/or claimed herein can be made and executed without undue experimentation in light of the present disclosure. While the articles, compositions, and methods of the inventive concept(s) have been described in terms of particular embodiments, it will be apparent to those of skill in the art that variations may be applied to the articles, compositions and/or methods and in the steps or in the sequence of steps of the methods described herein without departing from the concept, spirit and scope of the inventive concept(s). All such similar substitutes and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The term "about" is used to indicate that a value includes the inherent variation of error for the device, the method being employed to determine the value and/or the variation that exists among study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items. As used herein, the phrase "associated with" includes both direct association of two moieties to one another as well as indirect association of two moieties to one another. Non-limiting examples of associations include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety.

Turning now to particular embodiments, the presently disclosed and/or claimed inventive concept(s) relates generally to kits, devices, and methods for improving the performance and reliability of immunoassays. In particular, certain embodiments of the presently disclosed and/or claimed inventive concept(s) are related to kits, devices, and methods for minimizing hook effect interference in immunoassays.

Certain non-limiting embodiments of the presently disclosed and/or claimed inventive concept(s) are directed to methods for detecting the presence and/or concentration of a target peptide or protein analyte in a sample. In certain particular embodiments, the methods may be further defined as methods of minimizing hook effect interference in immunoassays.

The methods include combining, either simultaneously or wholly or partially sequentially: (1) a sample suspected of containing the target peptide or protein analyte; (2) at least one dye capable of binding to the target peptide or protein analyte, wherein an absorption band of the at least one dye shifts upon binding to the target peptide or protein analyte; and (3) at least one immunoassay reagent capable of specifically binding to the target peptide or protein analyte and capable of directly or indirectly generating a signal upon binding to the target peptide or protein analyte. The at least one dye and the at least one immunoassay reagent are then allowed to bind to target peptide or protein analyte present in the sample. The presence and/or concentration of the target peptide or protein analyte is then determined via detection of: (i) the signal generated by the immunoassay reagent and (ii) the absorption band of the at least one dye.

Any dye known in the art or otherwise contemplated herein that is capable of functioning in accordance with the presently disclosed and/or claimed inventive concept(s) and thus providing a mechanism by which hook effect interference may be minimized in immunoassays falls within the scope of the presently disclosed and/or claimed inventive concept(s). For example (but not by way of limitation), the at least one dye may be a pH indicator. Examples of pH indicators that may be utilized in accordance with the presently disclosed and/or claimed inventive concept(s) include, but are not limited to, thymol blue, phenolphthalein, Universal pH Indicator, Coomassie Protein Assay reagent, 660 nm Protein Assay Reagent, and combinations thereof.

The at least one dye may specifically bind to the target peptide or protein analyte. Alternatively, the at least one dye may non-specifically bind to the target peptide or protein analyte.

The dyes utilized to minimize hook interference in accordance with the presently disclosed and/or claimed inventive concept(s) may be incorporated into any immunoassay known in the art or otherwise contemplated herein. For example (but not by way of limitation), the at least one immunoassay reagent can include a capture antibody that binds to the target analyte and a detector antibody that binds to the capture antibody; however, any other immunoassay configurations known in the art or otherwise contemplated herein also fall within the scope of the presently disclosed and/or claimed inventive concept(s).

In certain non-limiting embodiments, the signal generated by the immunoassay reagent may be detected via an agglutination assay.

Any target peptide or protein analytes capable of detection via immunoassays may be detected via the methods of the presently disclosed and/or claimed inventive concept(s). Examples of target analytes include, but are not limited to, albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

Any biological sample known in the art for use with immunoassays as described herein may be utilized in accordance with the presently disclosed and/or claimed inventive concept(s). Examples of biological samples that may be utilized include, but are not limited to, urine, whole blood or any portion thereof (i.e., plasma or serum), saliva, sputum, cerebrospinal fluid (CSF), intestinal fluid, intraperitoneal fluid, cystic fluid, sweat, interstitial fluid, tears, mucus, bladder wash, semen, combinations, and the like.

Any of the method steps described herein may be performed, for example but not by way of limitation, by a user. However, as used herein, the term "user" is not limited to use by a human being; rather, the term "user" may comprise (for example, but not by way of limitation) a computer, a server, a website, a processor, a network interface, a human, a user terminal, a virtual computer, combinations thereof, and the like.

The various embodiments of the presently disclosed and/or claimed inventive concept(s) may be utilized with any reflectance spectroscopic diagnostic instrument that is capable of (or has been modified to be capable of) functioning in accordance with the methods described herein. In certain, non-limiting embodiments, the instrument may be a point of care instrument. The reflectance spectroscopic diagnostic instrument may be a system or systems that are able to embody and/or execute the logic of the methods/processes described herein. Logic embodied in the form of software instructions and/or firmware may be executed on any appropriate hardware. For example, logic embodied in the form of software instructions and/or firmware may be executed by one or more components on a dedicated system or systems, on a personal computer system, on a distributed processing computer system, and/or the like. In some embodiments, the entire logic may be implemented in a stand-alone environment operating on an instrument (such as, but not limited to, a point of care instrument). In other embodiments, the logic may be implemented in a networked environment such as a distributed system in which multiple instruments collect data that is transmitted to a centralized computer system for analyzing the data and supplying the results of the analysis to the instruments. Each element of the instrument may be partially or completely network-based or cloud based, and may or may not be located in a single physical location.

Circuitry used herein includes (but is not limited to) analog and/or digital components, or one or more suitably programmed processors (e.g., microprocessors) and associated hardware and software, or hardwired logic. Also, "components" may perform one or more functions. The term "component" may include hardware, such as but not limited to, a processor (e.g., microprocessor), an application specific integrated circuit (ASIC), field programmable gate array (FPGA), a combination of hardware and software, and/or the like.

Software utilized herein may include one or more computer readable medium (i.e., computer readable instructions) that when executed by one or more components cause the component to perform a specified function. It should be understood that the algorithms described herein may be stored on one or more non-transient memory. Non-limiting exemplary non-transient memory may include random access memory, read only memory, flash memory, and/or the like. Such non-transient memory may be electrically based, optically based, and/or the like.

Certain non-limiting embodiments of the presently disclosed and/or claimed inventive concept(s) are directed to reagent kits useful for conveniently performing the immunoassay methods described herein above. The reagent kit includes at least one immunoassay reagent as described in detail herein above, along with at least one dye as described in detail herein above.

Certain other non-limiting embodiments of the presently disclosed and/or claimed inventive concept(s) are directed to an immunoassay device (such as, but not limited to, an immunoassay cartridge) which contain the reagent kits described herein above and which are for use in the immunoassay methods described herein above. For example, the immunoassay device may include at least one compartment capable of receiving a sample suspected of containing the target peptide or protein analyte, wherein the at least one compartment includes at least one immunoassay reagent as described in detail herein above and at least one dye as described in detail herein above.

In addition, the reagent kits and/or immunoassay devices of the presently disclosed and/or claimed inventive concept(s) may further contain other component(s) and/or reagent(s) for conducting any of the particular immunoassays described or otherwise contemplated herein. The nature of these additional component(s)/reagent(s) will depend upon the particular immunoassay format, and identification thereof is well within the skill of one of ordinary skill in the art. Examples of additional reagents/components that may be present in the reagent kits and/or immunoassay devices of the presently disclosed and/or claimed inventive concept(s) include, but are not limited to, diluents, wash solutions (such as but not limited to, isotonic solutions), lysing agents (for lysing red blood cells), excipients (utilized for the reconstitution of lyophilized reagents), labeling agents, interference solutions, positive controls, negative controls, quality controls, and/or actuators, as well as any combination thereof.

The reagents utilized in accordance with the presently disclosed and/or claimed inventive concept(s) may be provided in any form and/or formulation that will allow them to function in accordance with the presently disclosed and/or claimed inventive concept(s). For example but not by way of limitation, it may be desirable to dispose the reagents in the form of single use reagents. In addition, it may be desirable to lyophilize one or more of the reagents; the use of dried reagents in immunoassay devices is described in detail in International Patent Application Publication No. WO 2013/078130 (published May 30, 2013, to Siemens Healthcare Diagnostics Inc., Tarrytown, NY; the entire contents of which are hereby expressly incorporated herein by reference). Also, multiple components may be disposed together in a single formulation and/or lyophilized in a single particle, if desired.

In particular (but non-limiting) embodiments, the reagent kit and/or immunoassay device may further include an assay buffer in which the at least one dye is disposed.

In other particular (but non-limiting embodiments), the at least one dye may be present in the reagent kit and/or immunoassay device in the form of a dried reagent. In addition, the at least one immunoassay reagent may also be present in the reagent kit and/or immunoassay device in the form of a dried reagent.

The components/reagents may each be disposed in separate containers/compartments of the reagent kits and/or immunoassay devices, or various components/reagents can be combined in one or more containers/compartments, depending on factors such as (but not limited to) the competitive nature of the antibody binding constants/efficiencies and/or the stability of the reagents. The reagent kits and/or immunoassay devices may further include other separately packaged reagents for conducting an assay.

The relative amounts of the various components/reagents in the kits and/or immunoassay devices can vary widely to provide for concentrations of the components/reagents that substantially optimize the reactions that need to occur during the assay methods and further to optimize substantially the sensitivity of an assay. Under appropriate circumstances, one or more of the components/reagents in the kit/device can be provided in a dry form, such as a lyophilized particle (including but not limited to, spheres, microtablets, powders, microspots, etc.), and the reagent kit/device may further include excipient(s) for dissolution of the dried reagents; in this manner, a reagent solution having the appropriate concentrations for performing a method or assay in accordance with the presently disclosed and/or claimed inventive concept(s) can be obtained from these components.

The reagent kits of the presently disclosed and/or claimed inventive concept(s) may further include a set of written instructions explaining how to use the kit. A kit of this nature can be used with any of the immunoassay devices and/or in any of the methods described or otherwise contemplated herein.

The immunoassay device may have one or more manual functions associated therewith (i.e., wherein pipetting is required for addition of one or more reagents and/or movement of a mixture between two compartments); alternatively, the immunoassay device may be a fully automatic, closed system in which the necessary reagents/components are disposed in various compartments during construction of the immunoassay device (wherein the various compartments are in continuous fluidic communication (or are capable of being in continuous fluidic communication)), and thus no manual manipulation of the sample and/or reagent(s) is required for performance of the assay after the sample is added to the immunoassay device.

The immunoassay device comprises one or more compartments containing the components described herein above; the immunoassay device may be provided with any number of compartments, any arrangement of compartments, and any distribution of the components therebetween, so long as the device is able to function in accordance with the presently disclosed and/or claimed inventive concept(s). When provided with multiple compartments, the compartments may be completely separated from one another, or one or more compartments may be capable of being in fluidic communication with one another. Various structures of immunoassay devices that are capable of use in accordance with the presently disclosed and/or claimed inventive concept(s) are well known in the art, and therefore no further description thereof is deemed necessary.

In certain non-limiting embodiments, the immunoassay device may include at least two compartments capable of being in fluidic communication with one another, and the at least one immunoassay reagent and the at least one dye may be disposed in the same compartment. Alternatively, the immunoassay device may include at least two compartments capable of being in fluidic communication with one another, and the at least one immunoassay reagent and the at least one dye may be disposed in different compartments.

The immunoassay device may further include a sample application chamber and/or an inlet channel in which a sample may be applied/disposed. The sample application chamber/inlet channel may be capable of being in fluidic communication with the one or more compartments of the immunoassay device. In addition, when the immunoassay device is provided with both a sample application chamber and an inlet channel, the sample application chamber may be capable of being in fluidic communication with the inlet channel, while the inlet channel may be capable of being in fluidic communication with the one or more compartments in which the reagents are disposed.

In certain embodiments, the immunoassay device includes at least first and second compartments. The first compartment is capable of receiving a biological sample and, if desired (but not by way of limitation), may include a mechanism for separating protein/peptide from the bulk of the sample. Said separation mechanisms are well known in the art of immunoassay devices, and therefore no further description thereof is deemed necessary. The second compartment is capable of being in fluidic communication with the first compartment and includes the at least one immunoassay reagent and/or the at least one dye for performing the immunoassay methods described in detail herein above. Alternatively, the immunoassay device may include a third compartment, wherein the at least one immunoassay reagent and the at least one dye are separated between the second and third compartments.

The immunoassay device may also include an optical read chamber that is capable of being optically interrogated by a spectrometer. The optical read chamber may be associated with any of the compartments described herein above, or the optical read chamber may be associated with a separate compartment from those described herein above.

In certain embodiments, the immunoassay device may further include one or more actuators that are responsible for releasably moving certain portions of the device as needed (such as, but not limited to, moving a separation membrane from a sample application chamber to an immunoassay chamber and/or an optical read chamber). When present, the actuator(s) may be manually and/or automatically actuated.

Any of the compartments of the immunoassay device may be sealed to maintain reagent(s) disposed therein in a substantially air tight environment until use thereof; for example, compartments containing lyophilized reagent(s) may be sealed to prevent any unintentional reconstitution of the reagent(s). The inlet channel and a compartment, as well as two compartments, may be described as being "capable of being in fluidic communication" with one another; this phrase indicates that the compartment(s) may still be sealed, but the two compartments are capable of having fluid flow therebetween upon puncture of a seal formed therein or therebetween.

The kits/immunoassay devices of the presently disclosed and/or claimed inventive concept(s) may be provided with any other desired features known in the art or otherwise contemplated herein. For example, but not by way of limitation, the kits/immunoassay devices of the presently disclosed and/or claimed inventive concept(s) may further include one or more additional compartments containing other solutions, such as but not limited to, diluents, wash solutions, lysing agents (for lysing red blood cells), excipients (utilized for the reconstitution of lyophilized reagents), labeling agents, interference solutions, positive controls, negative controls, quality controls, and/or actuators, as well as any combination thereof. For example, the kits/immunoassay device may include one or more additional compartments containing a diluent, and these additional compartment(s) may be capable of being in fluidic communication with any other compartment(s) of the device. In another example, the kits/immunoassay device may further include one or more additional compartments containing at least one excipient for reconstitution of one or more lyophilized reagents, and the additional compartment(s) may be capable of being in fluidic communication with any other compartment(s)/channel(s) of the device (such as the compartment containing the lyophilized reagent). Further, the kits/immunoassay device may include one or more additional compartments containing a wash solution, and the compartment(s) may be capable of being in fluidic communication with any other compartment(s)/channel(s) of the kit/device.

In addition, any of the kits/immunoassay devices described or otherwise contemplated herein may include multiple assays multiplexed in a single kit/device. When multiple assays are present, both of the assays may be constructed and function as described herein. Alternatively, an assay as described herein may be multiplexed with any other type of assay known in the art that is capable of being contained within the kits/immunoassay devices of the presently disclosed and/or claimed inventive concept(s). When multiple assays are present in a single kit/immunoassay device, the two or more assays may be run simultaneously and/or sequentially (including wholly or partially sequentially). When two or more assays are run simultaneously, it may be desired to utilize two or more detection reagents that are detected at different masses and/or wavelengths.

When multiple assays are present in a single immunoassay device, multiple inlet channels may be connected to the sample application chamber. In certain embodiments, a portion of the sample may be passed from the sample application chamber to the multiple inlet channels without regard for the content thereof. Alternatively, structure(s) may be present in the sample application chamber, the inlet channels, and/or the connection therebetween that allow for separation of certain components from the whole sample and delivery of said components to the different assays. A non-limiting example of a sample distribution device that may be utilized in accordance with the presently disclosed and/or claimed inventive concept(s) is described in detail in US Patent Application Publication Nos. 2016/0008813 and 2016/0318019 (published Jan. 14, 2016, and Nov. 3, 2016, respectively, to Siemens Healthcare Diagnostics Inc., Tarrytown, NY; the entire contents of each of which are hereby expressly incorporated herein by reference).

EXAMPLES

Examples are provided hereinbelow. However, the presently disclosed and/or claimed inventive concept(s) is to be understood to not be limited in its application to the specific experimentation, results and laboratory procedures. Rather, the Examples are simply provided as one of various embodiments and are meant to be exemplary, not exhaustive.

Example 1: Investigation Into Compensation for the MicroAlbumin Hook Effect pH indicators are dyes which respond calorimetrically to the pH of their local environment. Upon binding to proteins such as albumin, the local environmental pH changes, and this response can be linked to the presence of protein. The current IgM antibody capture (MAC) immunoassay has a "hook" effect, i.e., a region at high concentration where agglutination is actually decreased and could cause a false negative result (see FIG. 1). In contrast, the dose response slope could be increased (and the hook decreased or removed) by using the detection system of the presently disclosed and/or claimed inventive concept(s). In the detection system disclosed and/or claimed herein, a dye-binding assay is added concomitant with the agglutination assay, so that the hook effect can be mitigated and the dose response extended. The use of a dye pH indicator in this manner can detect the addition of high protein levels that normally result in the hook effect seen in the current MicroAlbumin assays.

Various types of dye-binding assays may be utilized in accordance with the presently disclosed and/or claimed inventive concept(s). For example (but not by way of limitation), data is provided herein below for two different categories of dye-binding assays. The first type of assay utilizes a dye that is not typically used for protein detection, but is designed to be compatible with the current microalbumin assay. The second type of assay approach utilizes a standard protein detecting dye assay which could also be used to remove the hook effect on immunoassay systems.

Materials:
Dye Indicators

Three dye indicators were utilized herein and include thymol blue, phenolphthalein, and Universal pH Indicator.

Figure 2:
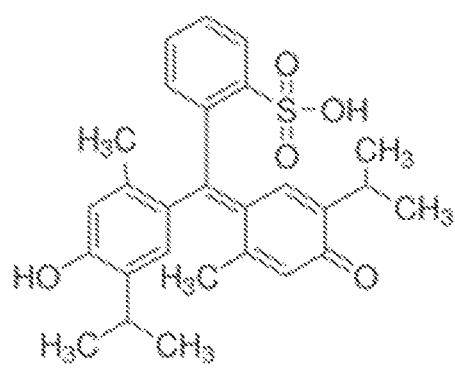
FIG. 2 illustrates the structure of thymol blue and spectrophotometric measurements obtained upon interaction of thymol blue with varying concentrations of albumin at two different wavelengths (595 nm and 455 nm).

Thymol blue (the structure of which is shown in FIG. 2, left panel) was obtained from Sigma-Aldrich Corp. (St. Louis, MO; Lot No. MKBR0446V), and had a purple powder format and a pKa of 8.9. The dye preparation utilized in this example was prepared by dissolving 0.1 g thymol blue in 21.5 mL 0.01 M NaOH, which was then diluted to 250 mL with purified water.

Figures 3, 4:
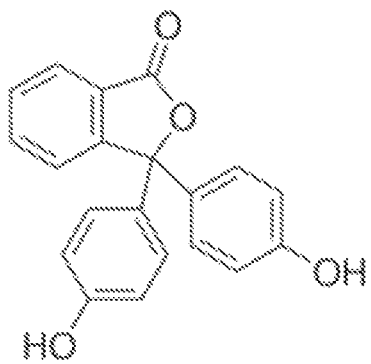
FIG. 3 illustrates the structure of phenolphthalein and spectrophotometric measurements obtained upon interaction of phenolphthalein with varying concentrations of albumin at 552 nm.
FIG. 4 illustrates spectrophotometric measurements obtained upon interaction of Universal pH Indicator with varying concentrations of albumin at two different pH's and wavelengths (pH 8 at 617 nm and pH 9 at 572 nm).

Phenolphthalein (the structure of which is shown in FIG. 3, left panel) was obtained from Sigma-Aldrich Corp. (St. Louis, MO; Lot No. MKBP2993V), and had a colorless liquid format and a pKa of 9.4. The dye was utilized in the preparation format provided by the manufacturer.

Universal pH Indicator solution was obtained from Fluka Analytical (Honeywell Research Chemicals, Mexico City, Mexico; Lot NO. SZBG0080V), and had a red liquid format and unknown pKa. The dye was utilized in the preparation format provided by the manufacturer.

Protein Assays

Coomassie Protein Assay reagent was obtained from ThermoFisher Scientific (Waltham, MA; Reference No. RE234426), and had a liquid format. The assay was utilized in the preparation format provided by the manufacturer.

Pierce 660 nm Protein Assay was obtained from ThermoFisher Scientific (Waltham, MA; Lot No. R623191), and had a liquid format. The assay was utilized in the preparation format provided by the manufacturer.

Results:

Dye Indicators

The procedures were designed to mimic those used in a microalbumin assay, such as (but not limited to) the microalbumin assay cartridges utilized on the DCA VANTAGE® analyzer (Siemens Medical Solutions USA, Inc., Malvern, PA). This instrument is essentially a spectrophotometer, so the conditions below are capable of incorporation into a system of this type. These dyes could be incorporated into the assay buffer or added as a dried reagent inside the cartridge.

For each indicator, enough material was added to the buffer to give a color intensity that could be easily read on a spectrophotometer. These concentrations are given in the Materials sections above. This solution was measured with the spectrophotometer, and the peak wavelength and absorbance were recorded. Protein was added, and the solution was measured again and the results recorded. The thymol blue and phenolphthalein have pKa values near 9, and they were therefore tested with pH 9 buffer. The Universal pH Indicator solution covers a range of pH levels; therefore, this indicator was tested with pH's of 7, 8, and 9. The data obtained upon interaction of each dye with the various concentrations of albumin additions are shown in the FIGS. 2-4 for thymol blue, phenolphthalein, and Universal pH Indicator solution, respectively. The pH of each solution was checked after addition of the stock albumin concentration, and the pH change of each assay solution was negligible. Therefore, the observed differences shown in FIGS. 2-4 can definitively be attributed to a binding of each dye to the albumin.

Each of the indicators demonstrated change with the addition of protein. For example, as shown in FIG. 4, when the Universal pH Indicator solution was tested at a pH of 8, the peak was at 617 nm with an absorbance of 0.131. After protein was added, the peak changed to 418 nm, and the 617 nm absorbance dropped to 0.045.

The dyes above were chosen because of compatibility with the current microalbumin assay, which occurs in the pH 8 to 9 range. However, there are many other protein detection systems with a more acidic nature that are known or otherwise contemplated in the art (including standard commercially-available protein systems) and that could also be utilized in combination with an immunoassay in accordance with the presently disclosed and/or claimed inventive concept(s). Any of these protein detection systems could also be used in an automated system where the albumin hook effect exists.

Protein Assays

The protein assays were performed following the manufacturer's recommended procedures. For the Pierce 660 nm Protein Assay, 0.1 ml protein was added to 1.5 mL of reagent. After incubation at room temperature for five minutes, the solution was read on the spectrophotometer at 660 nm. Use of the Coomassie protein assay reagent followed a similar process; 0.03 ml protein was added to 1.5 mL of reagent, and after incubation at room temperature for ten minutes, the solution was read on the spectrophotometer at 595 nm. Albumin samples of 30, 300, and 5000 mg/dL, along with a 200 mg/dL albumin standard from ThermoFisher Scientific (Waltham, MA), were tested using two replicates each.

The 5000 mg/dL sample was tested on three DCA VANTAGE® analyzers (Siemens Medical Solutions USA, Inc., Malvern, PA), where each assay returned an albumin value of >15 mg/dL.

An increase in spectrophotometric absorbance was observed upon increase in protein with both of the protein assays tested. The Pierce assays were off the scale for the two highest levels. In contrast, the hook effect typically observed with the DCA VANTAGE® analyzer was seen when the 5000 mg/dL sample yielded albumin levels of less than 15 mg/dL.

Figure 5:
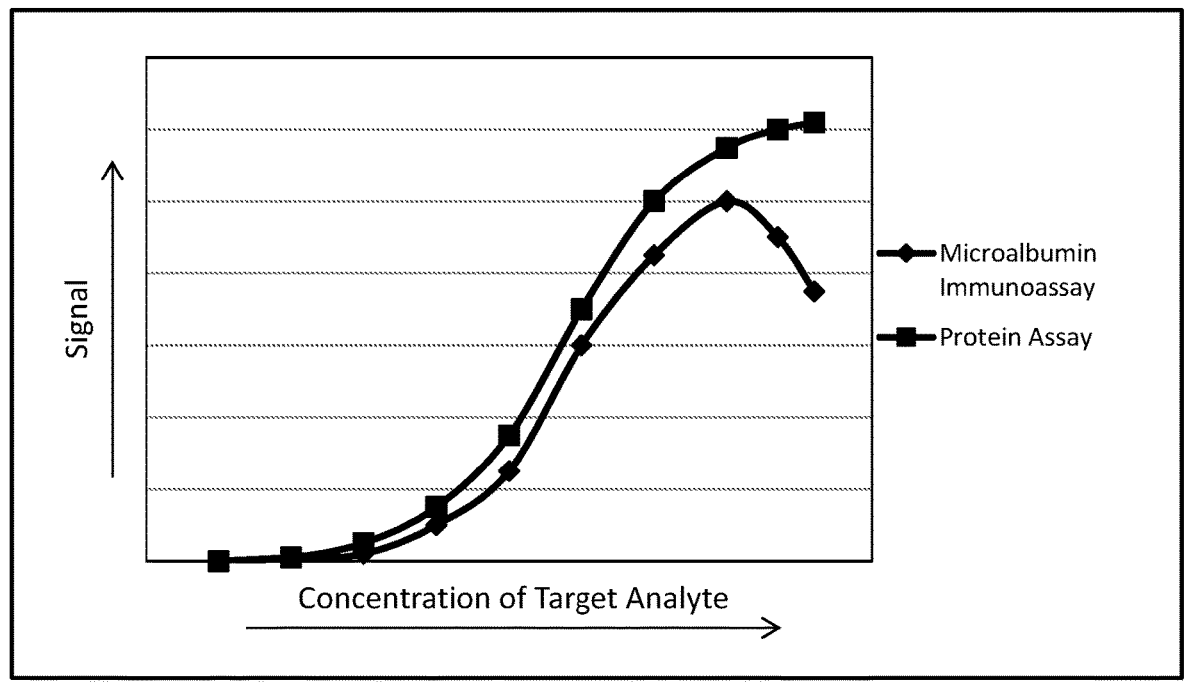
FIG. 5 illustrates exemplary spectrophotometric measurements of albumin concentrations that can be obtained with a microalbumin immunoassay (◊) and a protein assay reagent (□).

FIG. 5 is a graph comparing exemplary spectrophotometric measurements of albumin concentrations that could be obtained with a microalbumin immunoassay (◇) and a protein assay reagent (□). As can be seen, a hook effect is observed with the microalbumin immunoassay, as the large concentrations of analyte simultaneously saturate both capture and detection antibodies and thus result in a falsely decreased concentration measurement at the highest concentrations. However, no hook effect is observed in the protein assay; the spectroscopic measurements for increasing analyte concentrations in the protein assay continue to increase in a somewhat linear fashion until an upper plateau is reached. Since the protein assay relies on a single reagent (rather than two antibodies that can both become saturated), there is no competition that can interfere with the protein assay, and thus there is no decrease in the spectroscopic measurements at high analyte concentrations. While saturation levels of analyte result in decreasing measurements with the immunoassay, saturation levels of analyte in the protein assay will result in substantially the same measurement at an upper plateau level.

Therefore, these examples demonstrate that the addition to an immunoassay of a reagent capable of binding to a target peptide or protein analyte, wherein an absorption band of the dye shifts upon binding to the target peptide or protein analyte, will minimize hook effect interference in the immunoassay.

Figure 6:
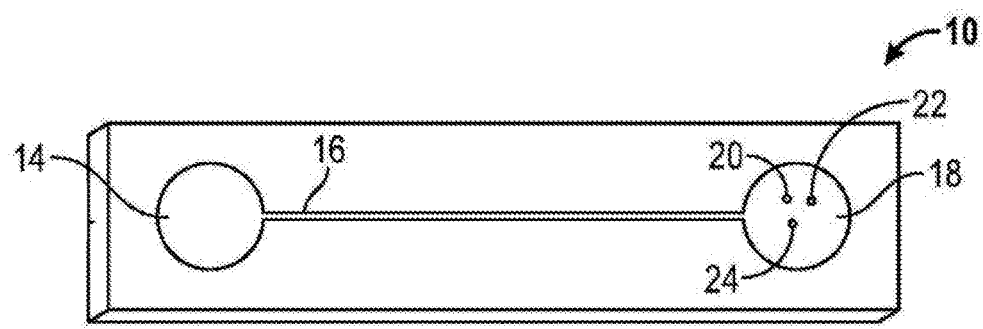
FIG. 6 illustrates an immunoassay device constructed in accordance with the present disclosure.

FIG. 6 illustrates one non-limiting embodiment of an immunoassay device 10 constructed in accordance with the present disclosure. The immunoassay device 10 comprises a sample application chamber 14 capable of receiving a sample suspected of containing the target analyte; at least one compartment 18 capable of being in fluidic communication with the sample application chamber 14, and at least one actuator 16 capable of being manually and/or automatically actuated to allow for fluidic communication between the sample application chamber 14 and the at least one compartment 18. The at least one compartment 18 comprises at least one dye 20 capable of binding to the target analyte, wherein a spectrophotometric absorption band of the at least one dye 20 shifts upon binding to the target analyte; at least one capture antibody 22 capable of specifically binding to the same target analyte as the at least one dye 20; and at least one detection antibody 24 that binds to the same target analyte, wherein binding of the at least one capture antibody 22 and the at least one detection antibody 24 to the same target analyte molecule generates a signal.

Non-Limiting Exemplary Embodiments of the Inventive Concept(s)

Certain embodiments are directed to a method for detecting the presence and/or concentration of a target peptide or protein analyte in a sample. The method incudes the steps of:
(a) combining, either simultaneously or wholly or partially sequentially:
(1) a sample suspected of containing the target peptide or protein analyte; (2) at least one dye capable of binding to the target peptide or protein analyte, wherein an absorption band of the at least one dye shifts upon binding to the target peptide or protein analyte; and (3) at least one immunoassay reagent capable of specifically binding to the target peptide or protein analyte and capable of directly or indirectly generating a signal upon binding to the target peptide or protein analyte;

The method also includes the steps of: (b) allowing the binding of (2) and (3) to target peptide or protein analyte present in (1); (c) determining the presence and/or concentration of the target peptide or protein analyte by detecting: (i) the signal generated by the immunoassay reagent; and (ii) the absorption band of the at least one dye.

In the method, the at least one dye may specifically or non-specifically bind to the target peptide or protein analyte.

In certain embodiments, the at least one dye is a pH indicator, such as (but not limited to) those selected from the group comprising thymol blue, phenolphthalein, Universal pH Indicator, Coomassie Protein Assay reagent, 660 nm Protein Assay Reagent, and combinations thereof.

In certain embodiments, the at least one immunoassay reagent comprises a capture antibody that binds to the target analyte and a detector antibody that binds to the capture antibody. In certain embodiments, the signal generated by the immunoassay reagent may be detected via an agglutination assay.

The target peptide or protein analyte detected by the method may be selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

The method may further be defined as a method of minimizing hook effect interference in an immunoassay.

Certain embodiments are directed to a reagent kit for use in an immunoassay, comprising: at least one immunoassay reagent capable of specifically binding to a target peptide or protein analyte and capable of directly or indirectly generating a signal upon binding to the target peptide or protein analyte; and at least one dye capable of binding to the target peptide or protein analyte, wherein an absorption band of the at least one dye shifts upon binding to the target peptide or protein analyte.

The at least one dye of the kit may be present in an assay buffer. Alternatively, the at least one dye may be in the form of a dried reagent.

The at least one dye present in the kit may specifically or non-specifically bind to the target peptide or protein analyte.

In certain embodiments of the kit, the at least one dye is a pH indicator, such as (but not limited to) those selected from the group comprising thymol blue, phenolphthalein, Universal pH Indicator, Coomassie Protein Assay reagent, 660 nm Protein Assay Reagent, and combinations thereof.

In certain embodiments of the kit, the at least one immunoassay reagent comprises a capture antibody that binds to the target analyte and a detector antibody that binds to the capture antibody. In certain embodiments, the signal generated by the immunoassay reagent may be detected via an agglutination assay.

In certain embodiments of the kit, the target peptide or protein analyte to be detected may be selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

Certain embodiments are directed to an immunoassay device for determining the presence and/or concentration of a target peptide or protein analyte in a sample, the immunoassay device comprising: at least one compartment capable of receiving a sample suspected of containing the target peptide or protein analyte, the at least one compartment comprising: at least one immunoassay reagent capable of specifically binding to a target peptide or protein analyte and capable of directly or indirectly generating a signal upon binding to the target peptide or protein analyte; and at least one dye capable of binding to the target peptide or protein analyte, wherein an absorption band of the at least one dye shifts upon binding to the target peptide or protein analyte.

The immunoassay device may be further defined as comprising at least two compartments capable of being in fluidic communication with one another, wherein the at least one immunoassay reagent and the at least one dye are disposed in the same compartment. Alternatively, the immunoassay device may be further defined as comprising at least two compartments capable of being in fluidic communication with one another, wherein the at least one immunoassay reagent and the at least one dye are disposed in different compartments.

The at least one dye of the immunoassay device may be present in an assay buffer. Alternatively, the at least one dye may be in the form of a dried reagent.

The at least one dye present in the immunoassay device may specifically or non-specifically bind to the target peptide or protein analyte.

In certain embodiments of the immunoassay device, the at least one dye is a pH indicator, such as (but not limited to) those selected from the group comprising thymol blue, phenolphthalein, Universal pH Indicator, Coomassie Protein Assay reagent, 660 nm Protein Assay Reagent, and combinations thereof.

In certain embodiments of the immunoassay device, the at least one immunoassay reagent comprises a capture antibody that binds to the target analyte and a detector antibody that binds to the capture antibody. In certain embodiments, the signal generated by the immunoassay reagent may be detected via an agglutination assay.

In certain embodiments of the immunoassay device, the target peptide or protein analyte to be detected may be selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

Thus, in accordance with the presently disclosed and/or claimed inventive concept(s), there have been provided kits, immunoassay devices, and methods which fully satisfy the objectives and advantages set forth hereinabove. Although the inventive concept(s) has been described in conjunction with the specific language set forth hereinabove, it is evident that many alternatives, modifications, and variations will be apparent to those of ordinary skill in the art. Accordingly, the presently disclosed and/or claimed inventive concept(s) is intended to embrace all such alternatives, modifications, and variations that fall within the spirit and broad scope of the presently disclosed and/or claimed inventive concept(s).

The following is a non-limiting list of illustrative embodiments:

1. A method for detecting the presence and/or concentration of a target peptide or protein analyte in a sample, comprising the steps of:

(a) combining, either simultaneously or wholly or partially sequentially: (1) a sample suspected of containing the target peptide or protein analyte; (2) at least one dye capable of binding to the target peptide or protein analyte, wherein an absorption band of the at least one dye shifts upon binding to the target peptide or protein analyte; and (3) at least one immunoassay reagent capable of specifically binding to the target peptide or protein analyte and capable of directly or indirectly generating a signal upon binding to the target peptide or protein analyte;
(b) allowing the binding of (2) and (3) to target peptide or protein analyte present in (1);
(c) determining the presence and/or concentration of the target peptide or protein analyte by detecting:
(i) the signal generated by the immunoassay reagent; and
(ii) the absorption band of the at least one dye.

2. The method of illustrative embodiment 1, wherein the at least one dye specifically binds to the target peptide or protein analyte.

3. The method of illustrative embodiment 1, wherein the at least one dye non-specifically binds to the target peptide or protein analyte.

4. The method of any one of illustrative embodiments 1-3, wherein the at least one dye is a pH indicator.

5. The method of illustrative embodiment 4, wherein the at least one dye is selected from the group comprising thymol blue, phenolphthalein, Universal pH Indicator, Coomassie Protein Assay reagent, 660 nm Protein Assay Reagent, and combinations thereof.

6. The method of any one of illustrative embodiments 1-5, wherein the at least one immunoassay reagent comprises a capture antibody that binds to the target analyte and a detector antibody that binds to the capture antibody.

7. The method of any one of illustrative embodiments 1-6, wherein the signal generated by the immunoassay reagent is detected via an agglutination assay.

8. The method of any one of illustrative embodiments 1-7, wherein the target peptide or protein analyte is selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

9. The method of any one of illustrative embodiments 1-8, further defined as a method of minimizing hook effect interference in an immunoassay.

10. A reagent kit for use in an immunoassay, comprising:
at least one immunoassay reagent capable of specifically binding to a target peptide or protein analyte and capable of directly or indirectly generating a signal upon binding to the target peptide or protein analyte; and
at least one dye capable of binding to the target peptide or protein analyte, wherein an absorption band of the at least one dye shifts upon binding to the target peptide or protein analyte.

11. The reagent kit of illustrative embodiment 10, wherein the at least one dye is present in an assay buffer.

12. The reagent kit of illustrative embodiment 10, wherein the at least one dye is in the form of a dried reagent.

13. The reagent kit of any one of illustrative embodiments 10-12, wherein the at least one dye specifically binds to the target peptide or protein analyte.

14. The reagent kit of any one of illustrative embodiments 10-12, wherein the at least one dye non-specifically binds to the target peptide or protein analyte.

15. The reagent kit of any one of illustrative embodiments 10-14, wherein the at least one dye is a pH indicator.

16. The reagent kit of illustrative embodiment 15, wherein the at least one dye is selected from the group comprising thymol blue, phenolphthalein, Universal pH Indicator, Coomassie Protein Assay reagent, 660 nm Protein Assay Reagent, and combinations thereof.

17. The reagent kit of any one of illustrative embodiments 10-16, wherein the at least one immunoassay reagent comprises a capture antibody that binds to the target analyte and a detector antibody that binds to the capture antibody.

18. The reagent kit of any one of illustrative embodiments 10-17, wherein the target peptide or protein analyte is selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

19. An immunoassay device for determining the presence and/or concentration of a target peptide or protein analyte in a sample, the immunoassay device comprising:
at least one compartment capable of receiving a sample suspected of containing the target peptide or protein analyte, the at least one compartment comprising:
at least one immunoassay reagent capable of specifically binding to a target peptide or protein analyte and capable of directly or indirectly generating a signal upon binding to the target peptide or protein analyte; and
at least one dye capable of binding to the target peptide or protein analyte, wherein an absorption band of the at least one dye shifts upon binding to the target peptide or protein analyte.

20. The immunoassay device of illustrative embodiment 19, further defined as comprising at least two compartments capable of being in fluidic communication with one another, wherein the at least one immunoassay reagent and the at least one dye are disposed in the same compartment.

21. The immunoassay device of illustrative embodiment 19, further defined as comprising at least two compartments capable of being in fluidic communication with one another, wherein the at least one immunoassay reagent and the at least one dye are disposed in different compartments.

22. The immunoassay device of any one of illustrative embodiments 19-21, wherein the at least one dye is present in the at least one compartment in the form of a dried reagent.

23. The immunoassay device of any of illustrative embodiments 19-22, wherein the at least one dye specifically binds to the target peptide or protein analyte.

24. The immunoassay device of any of illustrative embodiments 19-23, wherein the at least one dye non-specifically binds to the target peptide or protein analyte.

25. The immunoassay device of any one of illustrative embodiments 19-24, wherein the at least one dye is a pH indicator.

26. The immunoassay device of illustrative embodiment 25, wherein the at least one dye is selected from the group comprising thymol blue, phenolphthalein, Universal pH Indicator, Coomassie Protein Assay reagent, 660 nm Protein Assay Reagent, and combinations thereof.

27. The immunoassay device of any one of illustrative embodiments 19-26, wherein the at least one immunoassay reagent comprises a capture antibody that binds to the target analyte and a detector antibody that binds to the capture antibody.

28. The immunoassay device of any one of illustrative embodiments 19-27, wherein the target peptide or protein analyte is selected from the group comprising albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

What is claimed is:

1. An immunoassay device for determining the presence and/or concentration of a target analyte in a sample, wherein the target analyte comprises a peptide or protein, the immunoassay device sized and shaped for insertion in an automated analyzer, wherein the immunoassay device comprises:
  a sample application chamber capable of receiving a sample suspected of containing the target analyte;
  at least one compartment capable of being in fluidic communication with the sample application chamber, the at least one compartment comprising:
    at least one dye capable of binding to the target analyte, wherein a spectrophotometric absorption band of the at least one dye shifts upon binding to the target analyte;
    at least one capture antibody capable of specifically binding to the same target analyte as the at least one dye; and
    at least one detection antibody that binds to the same target analyte, wherein binding of the at least one capture antibody and the at least one detection antibody to the same target analyte molecule generates a signal; and
    wherein the at least one dye, the at least one capture antibody, and the at least one detection antibody are disposed in the same at least one compartment; and
  at least one actuator capable of being manually and/or automatically actuated to allow for fluidic communication between the sample application chamber and the at least one compartment.

2. The immunoassay device of claim 1, further comprising at least one optical read chamber that is capable of being in fluidic communication with the at least one compartment and the sample application chamber.

3. The immunoassay device of claim 1, wherein the at least one dye specifically binds to the target analyte.

4. The immunoassay device of claim 1, wherein the at least one dye non-specifically binds to the target analyte.

5. The immunoassay device of claim 1, wherein the at least one dye is selected from the group consisting of thymol blue, phenolphthalein, Universal pH Indicator, Coomassie Protein Assay reagent, 660 nm Protein Assay Reagent, and combinations thereof.

6. The immunoassay device of claim 1, wherein the target analyte is selected from the group consisting of albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

7. The immunoassay device of claim 1, wherein the at least one dye is present in an assay buffer.

8. The immunoassay device of claim 1, wherein the at least one dye is in the form of a dried reagent.

9. The immunoassay device of claim 1, wherein at least one of the capture antibody and detection antibody is in the form of a dried reagent.

10. The immunoassay device of claim 1, further comprising at least one excipient for dissolution of dried reagent.

11. A method for detecting the presence and/or concentration of a target analyte in a sample using an immunoassay and minimizing hook interference in the immunoassay, wherein the target analyte comprises a peptide or protein, and wherein the method comprises the steps of:
  (a) inserting a sample suspected of containing the target analyte into an immunoassay device sized and shaped for insertion in an automated analyzer, wherein the immunoassay device comprises:
    a sample application chamber capable of receiving a sample suspected of containing the target analyte;
    at least one compartment capable of being in fluidic communication with the sample application chamber, the at least one compartment comprising:
      at least one dye capable of binding to the target analyte, wherein a spectrophotometric absorption band of the at least one dye shifts upon binding to the target analyte;
      at least one capture antibody capable of specifically binding to the same target analyte as the at least one dye; and
      at least one detection antibody that binds to the same target analyte, wherein binding of the at least one capture antibody and the at least one detection antibody to the same target analyte molecule generates a signal; and
      wherein the at least one dye, the at least one capture antibody, and the at least one detection antibody are disposed in the same at least one compartment; and
    at least one actuator capable of being manually and/or automatically actuated to allow for fluidic communication between the sample application chamber and the at least one compartment;
  (b) inserting the immunoassay device into an automated analyzer;
  (c) activating the actuator of the immunoassay device to allow for:
    (i) the binding of the dye to the target analyte present in the sample; and
    (ii) the binding of the capture antibody to the target analyte present in the sample and the binding of the detection antibody to the target analyte to form an immunoassay complex containing the target analyte, the capture antibody, and the detection antibody;
  (d) detecting a value based on the absorption band of the dye;
  (e) detecting a value based on the signal generated by the immunoassay complex;
  (f) comparing the value detected in step (e) to the value detected in step (d) to determine if hook interference is observed; and
  (g) determining the presence and/or concentration of the target analyte based on the value detected in step (e) if hook interference is not observed in the comparison of step (f).

12. The method of claim 11, further comprising the step of:
  (h) repeating steps (a)-(e) at one or more different concentrations of the sample to detect two or more values for step (d) and two or more values for step (e).

13. The method of claim 12, wherein steps (f) and (g) are further defined as:
  (f) comparing a slope formed from the two or more values for step (e) to a slope obtained from the two or more values for step (d) to determine if hook interference is observed at one or more concentrations of the sample; and (g) determining the presence and/or concentration of the target analyte based on a value for step (e) obtained at a concentration of sample at which hook interference is not observed.

14. The method of claim 11, wherein the at least one dye specifically binds to the target analyte.

15. The method of claim 11, wherein the at least one dye non-specifically binds to the target analyte.

16. The method of claim 11, wherein the at least one dye is selected from the group consisting of thymol blue, phenolphthalein, Universal pH Indicator, Coomassie Protein Assay reagent, 660 nm Protein Assay Reagent, and combinations thereof.

17. The method of claim 11, wherein the signal generated by the immunoassay complex formed of target analyte and capture and detection antibodies is detected via an agglutination assay.

18. The method of claim 11, wherein the target analyte is selected from the group consisting of albumin, creatinine, ketone, bilirubin, urobilinogen, glycosylated hemoglobin (HbA1C), human chorionic gonadotropin (hCG), ferritin, growth hormone, prolactin, and thyroglobulin (Tg).

19. The immunoassay device of claim 1, wherein the at least one compartment in which the at least one dye, the at least one capture antibody, and the at least one detection antibody are disposed is further defined as an optical read chamber.

* * * * *